US00H002127H

(19) United States
(12) Statutory Invention Registration
Byrd

(10) Reg. No.: US H2127 H
(43) Published: Oct. 4, 2005

(54) CORROSION DETECTION BY DIFFERENTIAL THERMOGRAPHY

(75) Inventor: Larry W. Byrd, Huber Heights, OH (US)

(73) Assignee: The United States of America as represented by the Secretary of the Air Force, Washington, DC (US)

(21) Appl. No.: 10/122,122

(22) Filed: Apr. 12, 2002

(51) Int. Cl.[7] ..... G01J 5/00

(52) U.S. Cl. ..... 374/121

(58) Field of Search ..... 374/121, 120, 374/130, 141, 57, 4, 5, 45

(56) References Cited

U.S. PATENT DOCUMENTS

| | | | | | |
|---|---|---|---|---|---|
| 3,946,600 | A | * | 3/1976 | Rettig et al. | 73/587 |
| 4,647,220 | A | | 3/1987 | Adams et al. | |
| 4,836,858 | A | | 6/1989 | Reinhart | |
| 4,858,264 | A | | 8/1989 | Reinhart | |
| 5,031,456 | A | * | 7/1991 | Askwith et al. | 73/587 |
| 5,240,329 | A | * | 8/1993 | Zinkosky | 374/5 |
| 5,292,195 | A | * | 3/1994 | Crisman, Jr. | 374/4 |
| 5,526,689 | A | * | 6/1996 | Coulter et al. | 73/592 |
| 5,582,485 | A | * | 12/1996 | Lesniak | 374/5 |
| 5,654,977 | A | * | 8/1997 | Morris | 374/4 |
| 5,709,469 | A | * | 1/1998 | White et al. | 374/5 |
| 5,803,606 | A | * | 9/1998 | Petry et al. | 374/45 |
| 6,033,107 | A | * | 3/2000 | Farina et al. | 374/5 |
| 6,367,328 | B1 | * | 4/2002 | Gorman et al. | 73/592 |

FOREIGN PATENT DOCUMENTS

| | | | | |
|---|---|---|---|---|
| JP | 63159741 A | * | 7/1988 | G01N/25/72 |

* cited by examiner

*Primary Examiner*—Daniel Pihulic
(74) *Attorney, Agent, or Firm*—Gerald B. Hollins; Thomas L. Kundert

(57) ABSTRACT

A pulsed heat energized system for detecting corrosion or similar oxidation products located intermediate a layer of metal and an overlying layer of paint or other metal protective material. The system employs a continuing stream of radiant thermal energy pulses impinging on the external surface of the coated metal and responds to the phase angle difference between a waveform representing the energy pulses and a waveform representing the undulating temperature response of the paint surface to the energy pulses. Use of the system for detecting corrosion of a military or other aircraft in order to avoid stripping the aircraft for corrosion inspection and correction is contemplated. Enhanced independence of the corrosion detection from measurement variations and earlier detection of corrosion presence are achieved with respect to other corrosion arrangements.

11 Claims, 9 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CORROSION DETECTION BY DIFFERENTIAL THERMOGRAPHY

RIGHTS OF THE GOVERNMENT

The invention described herein may be manufactured and used by or for the Government of the United States for all governmental purposes without the payment of any royalty.;

BACKGROUND OF THE INVENTION

The U.S. Air Force spends millions of dollars each year inspecting aircraft for corrosion. Commercial aircraft owners and other governments also spend similar or greater amounts for this purpose. A significant part of this expense arises from the need to strip paint from the surface of an aircraft to detect corrosion according to present practices. This stripping is necessary because it is difficult to detect corrosion under paint by visual inspection until the paint blisters and significant damage to the painted aircraft has occurred. While inspection for corrosion remains as important as ever in order to prevent costly aircraft damage and even airframe failures, the environmental impact of the chemicals used for stripping purposes has made stripping practices even less desirable and prompted the investigation of means to detect corrosion without paint removal.

The patent art indicates aircraft manufacturers and others have also become concerned by the need to inspect aircraft for corrosion and by the related practice of stripping an aircraft in order to change its appearance or visual signature. The U.S. Pat. No. 4,647,220 of M.J. Adams et al., for example, discloses a pulsed energy and electronic scanning inclusive method of detecting corrosion located below an aircraft coating in which the corrosion detection is based on detection of surface temperature differentials resulting from exposing the aircraft to pulses of infrared energy. Notably, however the Adams et al. patent does not enjoy the advantages of detecting a phase angle lag between a pulsating energy waveform and the aircraft surface temperature undulations produced by that waveform and is thereby more sensitive to testing variations than is the system of the present invention. The somewhat related practice of stripping an aircraft in order to change its appearance or visual signature is disclosed, for example, in the U.S. Pat. Nos. 4,858,264 and 4,836,858 of T.J. Reinhart, which are assigned to the same assignee as the present patent. The patents and other documents referenced in each of the U.S. Patents identified here may also be of background interest with respect to the present invention: each of these patents Is hereby incorporated by reference herein.

SUMMARY OF THE INVENTION

The present invention provides a system for detecting phase lag between an applied periodic radiant heat input waveform and the temperature of a painted surface of, for example, an aircraft in order to provide detection of corrosion at an earlier stage and with less testing variable sensitivity than previous corrosion detection methods. The disclosed system does not require removal of the paint nor application of a high emissivity coating or toxic chemicals and is non-contacting.

It is therefore an object of the present invention to provide for the non destructive testing detection of subsurface corrosion or rusting or oxidized disintegration of a metallic surface.

It is another object of the present invention to provide detection of metallic corrosion that is hidden by paint or other organic coatings.

It is another object of the invention to provide detection of metallic corrosion that is hidden by the paint or other organic coatings applied to an aircraft.

It is another object of the invention to provide detection of hidden corrosion of the aluminum or other lightweight metals of an aircraft.

It is another object of the invention to provide detection of hidden corrosion by way of measuring a phase lag between applied thermal energy pulses and temperature cycling of the energized surface.

These and other objects of the invention will become apparent as the description of the representative embodiments proceeds.

These and other objects of the invention are achieved by the method of detecting. corrosion presence intermediate a workpiece metal substrate and an overlying layer of organic material, said method comprising the steps of:

applying a continuing periodic sequence of radiant thermal energy pulses to said workpiece metal substrate and overlying layer of organic material:

said radiant thermal energy pulses communicating from an external surface portion of said layer of organic material through said layer of organic material to said workpiece metal substrate;

sensing instantaneous temperature response undulations of said surface portion of said workpiece overlying layer of organic material in response to said continuing periodic sequence of radiant thermal energy pulses;

determining a phase angle of lag between said applied continuing periodic sequence of radiant thermal energy pulses and said instantaneous temperature response undulations of said surface portion of said workpiece overlying layer of organic material; and examining a workpiece map of said determined phase angles of lag for a corrosion presence-related pattern of instantaneous temperature response undulation phase angle variations.

BRIEF DESCRIPTION OF THE DRAWING

The accompanying drawings incorporated in and forming a part of the specification. illustrate several aspects of the present invention and together with the description serve to explain the principles of the invention. In the drawings.

DETAILED DESCRIPTION OF THE INVENTION

Figure 1:
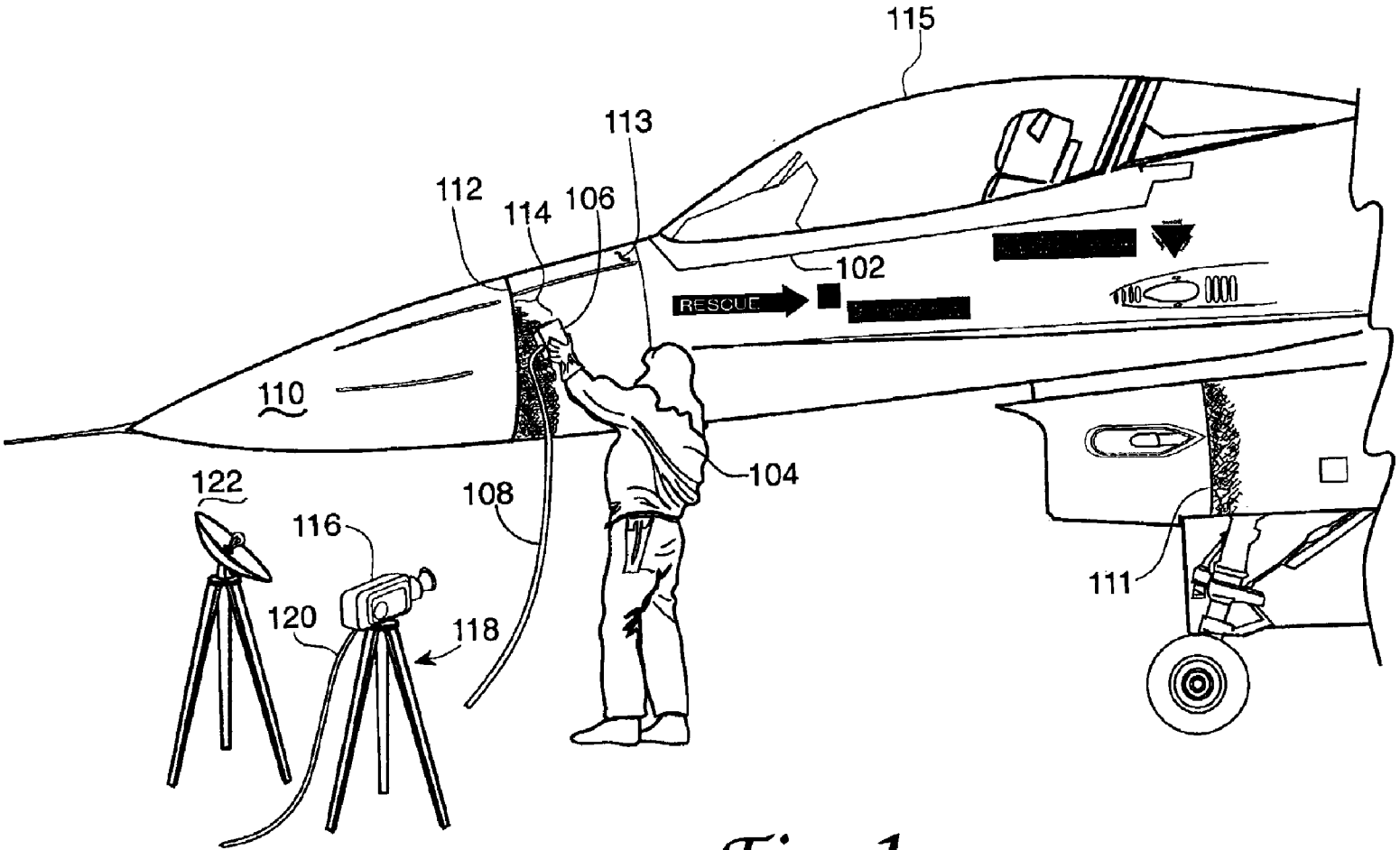
FIG. 1 shows a military aircraft corrosion detection sequence in which the present invention may be used.

FIG. 1 in the drawings shows a military aircraft corrosion detection sequence in which the present invention may be used. In the FIG. 1 drawing an operator 104 is shown to be exploring paint hidden portions of a tactical aircraft 100 in locations believed susceptible to the occurrence of paint obscured underlying metal corrosion. The region 114 of the aircraft 100 adjacent the interface 112 between aircraft radome 110 and aircraft fuselage 113 is susceptible to impact "dings" and other minor physical damage which can admit moisture and airborne corrosive agents conducive to the formation of paint hidden corrosion of the underlying aircraft metal. The aluminum, magnesium titanium and other lightweight high strength metal alloys used In aircraft and spacecraft vehicles are particularly susceptible to such underlying metal or subsurface corrosion effects. It is of course desirable that any such corrosion be detected as soon as possible in order to prevent structural weakening of the load carrying periphery metal of the aircraft 100 as well as undesirable unsightly disfigurement of the aircraft. Other regions of the aircraft 100 believed to be susceptible to paint damaging "dings" or chipping include the interface region 111 between engine inlet cowling and engine housing and the interface region 102 between canopy 115 and fuselage 113. Unfortunately, even though airframe corrosion may start with minor damage in the regions 102, 113 and 114 of an aircraft, it is known to creep in stealth along the interface between metal and paint over extended distances and through relatively complex aircraft contours.

Figure 2:
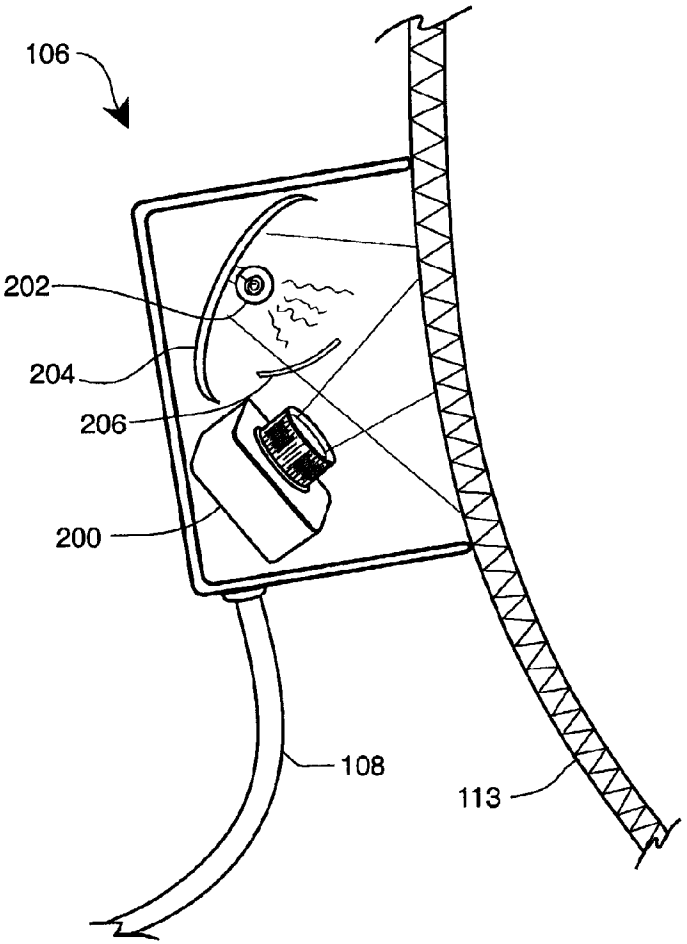
FIG. 2 shows details of a corrosion detection sensor usable In the FIG. 1 sequence.
Figure 3:
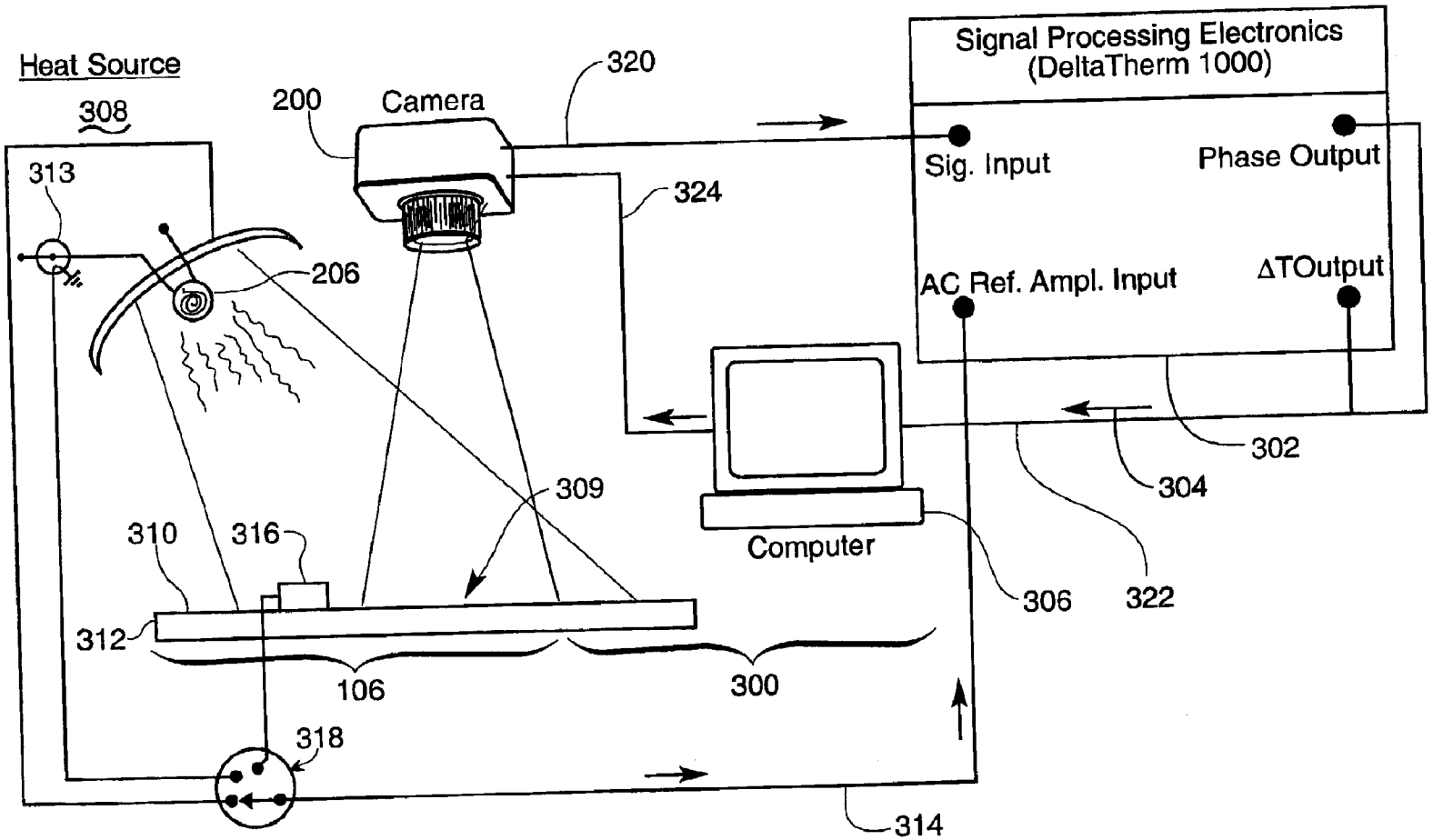
FIG. 3 shows additional details of a corrosion detection system according to the present invention.

Removal of extensive portions of the paint covering aircraft 100 has heretofore been practiced not only for the aesthetic purposes described in the above-identified two patents of T.J. Reinhart, but also for the exclusive purpose of detecting substrate metal corrosion. It is an object of the present invention to improve on this procedure by providing a system as represented in the FIG. 1 drawing wherein such corrosion can be detected through the paint or other aircraft coating in an early and non-destructive manner. Such detection is provided by way of the sensing head 106 connected by tether cord 108 to a computerized corrosion detection system as is shown in FIG. 3 of the drawings. The sensing head 106 is shown in the cross sectional view of FIG. 2 in the drawings to include a source of radiant energy 202, which may be attended by a reflector 204, and by an optical to electrical transducer such as the video camera 200.

As discussed in some detail below herein, the source of radiant energy 202 is preferably operated in an extended cycle of infrared energy emitting pulses according to the present invention. These pulses may moreover be achieved through use of current modulation of a lamp used to embody the source of radiant energy 202 or through use of mechanical additions to the FIG. 2 apparatus, for example, a moving reflector element at 204 or a moving optical modulator element as Is represented by the shutter mechanism at 206. The shutter mechanism 206 is especially useful at energy pulsation frequencies above the response capability of a lamp filament. In lieu of the handheld sensing head 106 shown in FIG. 1, the present invention may also be practiced with the use of a stationary camera 116 shown to be mounted on a tripod 118 or other support and connected by a tether cable 120 to a computerized corrosion detection system as is shown in FIG. 3. A fixed mounted pulsating heat source 122 may be used with the fixed camera 116. Notwithstanding advantages of more stable input data and other possible benefits available with the stationary camera 116 and fixed mounted pulsating heat source 122, for present discussion purposes use of the handheld sensing head 106 is presumed in the paragraphs following.

FIG. 3 in the drawings shows elements of the sensing head 106 together with a block diagram representation of additional components comprising a corrosion detection system according to the present invention. In the FIG. 3 drawing there is represented a test sample 309 and a computer 306 inclusive array of sensing head control and interface elements 300 connecting with a signal processing electronics module 302. Signal flow directions are indicated as at 304 between the FIG. 3 system components. Generally the FIG. 3 system uses a variable pulse radiant heat source 308, a heat source inclusive of the lamp 202 to heat the tested surface 310 of the aircraft being inspected for corrosion, and a differential thermography system including the camera 200 to determine the phase lag between a pulsating heater signal and the resulting temperature variation of the paint surface at 310.

Differential thermography systems as employed in FIG. 3 are available in the commercial test instrument marketplace. One system of this type that may be used with the present invention has been identified as the Stress Photonics Deltalherm 1000 system that was first made for the U.S. Air Force by Stress Photonics Inc. of 3002 Progress Road, Madison Wisconsin, under the U.S. Government Small Business Innovation Research (SBIR) contract F33615-95-C-2504, which originated at Wright-Patterson Air Force Base. Ohio 45433. Copies of a final report concerning this contract and the resulting system, titled "DIFFERENTIAL THERMOGRAPHY FOR ELEVATED TEMPERATURES" may be obtained from Stress Photonics Inc. and through persons including the present inventor at Wright Patterson Air Force Base. The contents of this report are hereby incorporated by reference herein. The F33615-95-C-2504 contract was not/is not classified.

The DeltaTherm 1000 and similar systems have also been made into commercial products by Stress Photonics Inc.; such products and technical information of the type disclosed in the contract final report are thus additionally available commercially. Other information relating to systems of the DeltaTherm 1000 type is understood to have been, published by Dr. Thomas Mackin of The University of Illinois at Champaign-Urbana. Additional differential thermography systems generally of the DeltaTherm 1000 type are also available commercially, several nondestructive infrared systems of this nature, including systems identified by the names of EchoTherm® and ThermoScope™, are made by Thermal Wave Imaging of 845 Livernois Street, Ferndale, Michigan, 48220-2308. Their website is http://www.thermalwave.com.

The signal to the "AC Ref Ampl. Input" terminal of the signal processing electronics 302 in FIG. 3, i.e. the signal on the path 314 in FIG. 3, is representative of the applied radiant flux. This signal may be derived from lamp current pulses by way of, for example, current transformer apparatus 313 in the case of the lower frequency radiant flux, derived from reflector motion signals in the case of moderate frequency radiant flux, and may originate in a heat flux to electrical signal transducer element 316 located within the heat flux pattern in the case of the higher frequency shutter controlled radiant flux. A switch, as shown at 318 in FIG. 3, may be used to select between these signal inputs in response to the needed lamp frequency.

Figure 4:
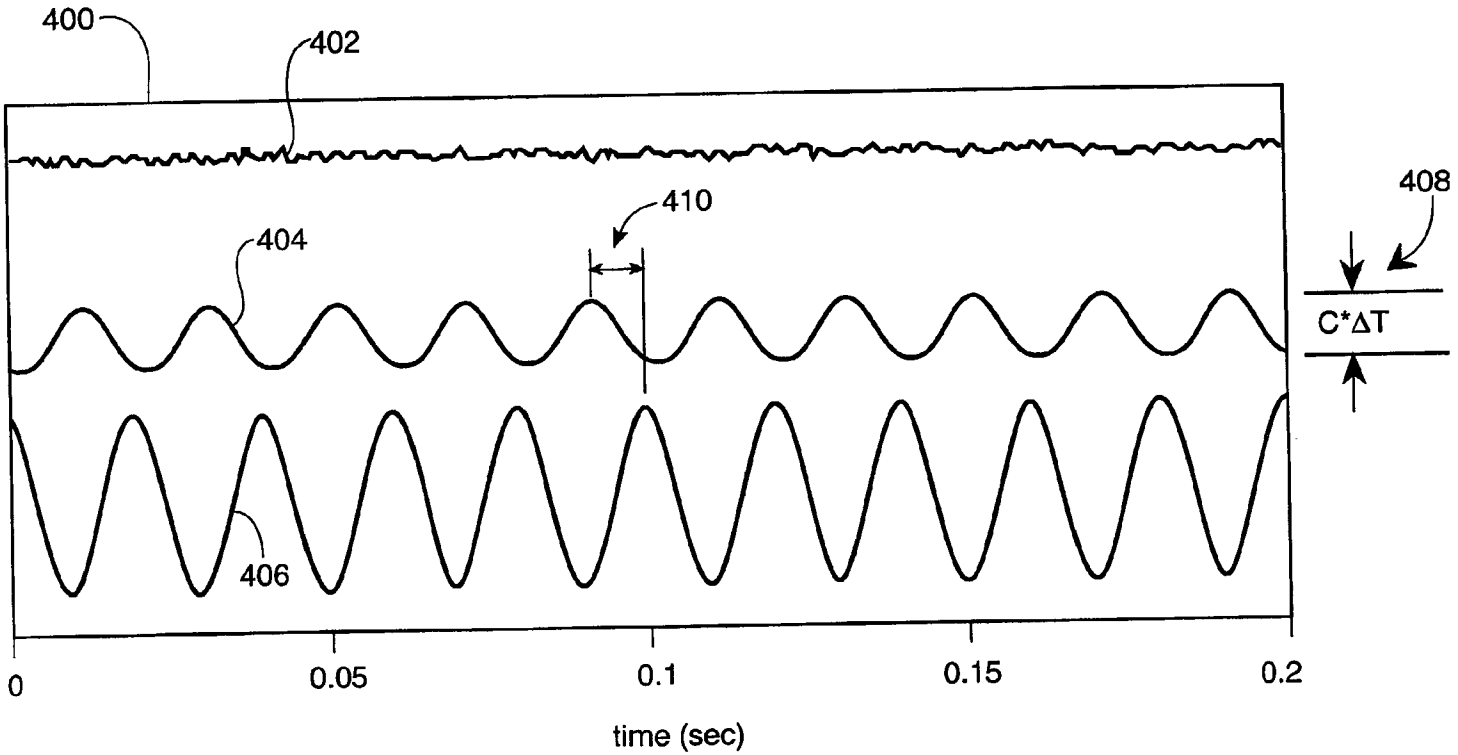
FIG. 4 shows typical signal waveforms for the FIG. 3 detection system.

FIG. 4 in the drawings shows the type of signals generated in the FIG. 3 system. In FIG. 4 the uppermost signal 402 represents raw camera pixel thermal data as communicated along the path 320 to the "Sig. Input" terminal of the Signal Processing Electronics 302 of the differential thermography system. The centermost of the FIG. 4 signals, shown at 404 represents the temperature variation of the paint surface 310 as it has been extracted from the signal 402 by filtering and amplification. This signal 404 may be represented mathematically in terms of a constant, C, and the change of temperature, $\Delta T$, as is shown at 408 in the FIG. 4 drawing. Mathematical representation of signal is found to be a convenience in working with the present invention in that computer simulations and mathematical modeling, as discussed for example in connection with FIG. 6 through FIG. 8 below herein, may be accomplished more rapidly than in the absence of such representation. The lowermost of the FIG. 4 signals, the signal 406 represents pulsations of the thermal flux generated by one of the heater lamps 122 and 206, the type of signal communicated along the path 314 in the FIG. 3 system. The pulsations in the signal 406 thus are the source of the other two signals 404 and 406 in the FIG. 4 drawing and represent the heat flux stimulation applied to the paint surface 310 in the present invention.

By filtering the thermal signal 402. In FIG. 4, the disclosed differential thermography systems can detect paint surface 310 temperature ripple magnitudes on the order of a few thousandths of a degree Kelvin, i.e. of a few mK. Temperature scales of this magnitude are shown in the FIG. 6 through FIG. 8 drawings herein. The nature of the filtering used in the Stress Photonics DeltaTherm 1000 system to extract the FIG. 4 temperature undulation data 404 from the raw data 402 is described in terms of a least squares method and single low frequency operation-vector lock-in technique, both of which are disclosed mathematically and in text in appendix B of the above identified final report for U.S. Government contract F33615-95-C-2504, titled "DIFFERENTIAL THERMOGRAPHY FOR ELEVATED TEMPERATURES". Section 3.4 of this same report, titled "Variable Amplitude Signal Processing" also contains mathematical and text descriptions relevant to the signal processing accomplished in the DeltaTherm 1000 differential thermography system.

Output signals from the signal processing electonics 302 of the differential thermography system appear at the right hand edge of the block 302 in the FIG. 3 drawing. The uppermost of these signals is the phase output signal and the lowermost is the differential temperature output signal. Both of these signals are communicated to the computer 306 along the path 322 for viewing in the manner of the FIG. 4 drawing, for data storage, for control of the camera 200 along path 324 (e.g. for focal length control) and for possible use by other apparatus employable with the system.

The phase lag of interest in the present invention, the phase difference between the waveforms 406 and 404 in FIG. 4, is indicated at 410 in the FIG. 4 drawing. As has been described earlier herein, this phase lag is found to be a better and more reliable indicator of corrosion and other effects Intermediate the metal skin and the paint layer of an aircraft than are the amplitude measurements used in other corrosion detection systems. In observing the FIG. 4 waveforms it may become apparent that the instant of heat flux first application, the instant of zero time, is not shown in the FIG. 4 drawing but occurs somewhere to the left of the leftmost vertical line of the FIG. 4 drawing. The waveforms of FIG. 4 therefore represent steady state thermal conditions achieved after a preceding transient period not appearing In FIG. 4. It may also be recognized that each of the waveforms 402, 404 and 406 shown in the FIG. 4 drawing are scaled to a different degree with respect to vertical amplitude, i.e., the amplitudes appearing along the left axis of a drawing such as the FIG. 4 drawing.

If a corrosion layer exists in the FIG. 3 test specimen 312, thus creating a thermal resistance between the paint and the aircraft metal, i.e. the paint substrate, the detected phase lag will change. This phase lag is also a function of the geometric and thermal parameters of the coated substrate as well as the frequency of the applied heater signal. With respect to corrosion, there are two possibilities that may occur. In the first, the test specimen region examined by the system will be only partially corroded. In this case a map of the phase lag over the test specimen region will show the phase difference between the corroded and undamaged regions. In the second case the entire region being examined may be corroded. In this case a map of the phase lag will show a uniform value. In this instance the test specimen map needs to be compared with the phase lag for a non-corroded surface to determine if corrosion is present.

Figure 10:
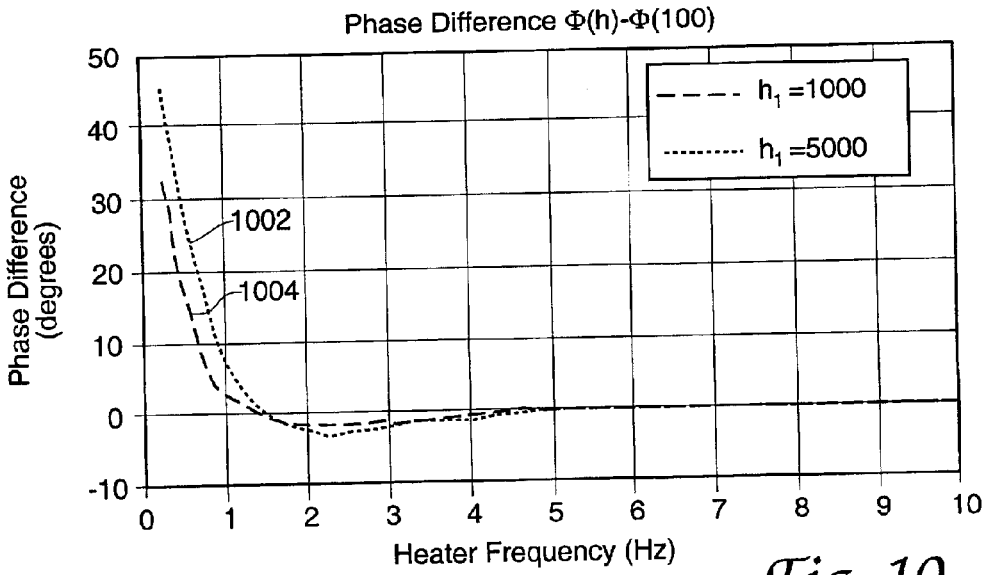
FIG. 10 shows a phase difference relationship for two different values of thermal conductance for the present invention.

The difference in phase lag for values of thermal conductance, h, of 100 and 1000 watts per meter$^2$-degree Kelvin CW/m$^2$K) in the FIG. 3 sample 309 are shown by the curve 1002 in FIG. 10 of the drawings herein. Similarly the difference in phase lag for values of thermal conductance, h, of 100 and 5000 watts per meter$^2$-degree Kelvin (W/m$^2$K) are shown by the curve 1004 In FIG. 10 of the drawings. These FIG. 10 showings of difference between two dissimilar values of the variable h are in accordance with the "Phase Difference $\Phi(h)$-$\Phi(100)$" title for the FIG. 10 drawing. The value of 100 W/m$^2$K corresponds to the presence of a corrosion layer on the substrate 312 in FIG. 3 and the values of 1000 W/m$^2$K and 5000 W/m$^2$K correspond to two possible cases with no substrate corrosion present The substrate used for the FIG. 10 data is a 2 mm-thick aluminum plate.

Figure 13:
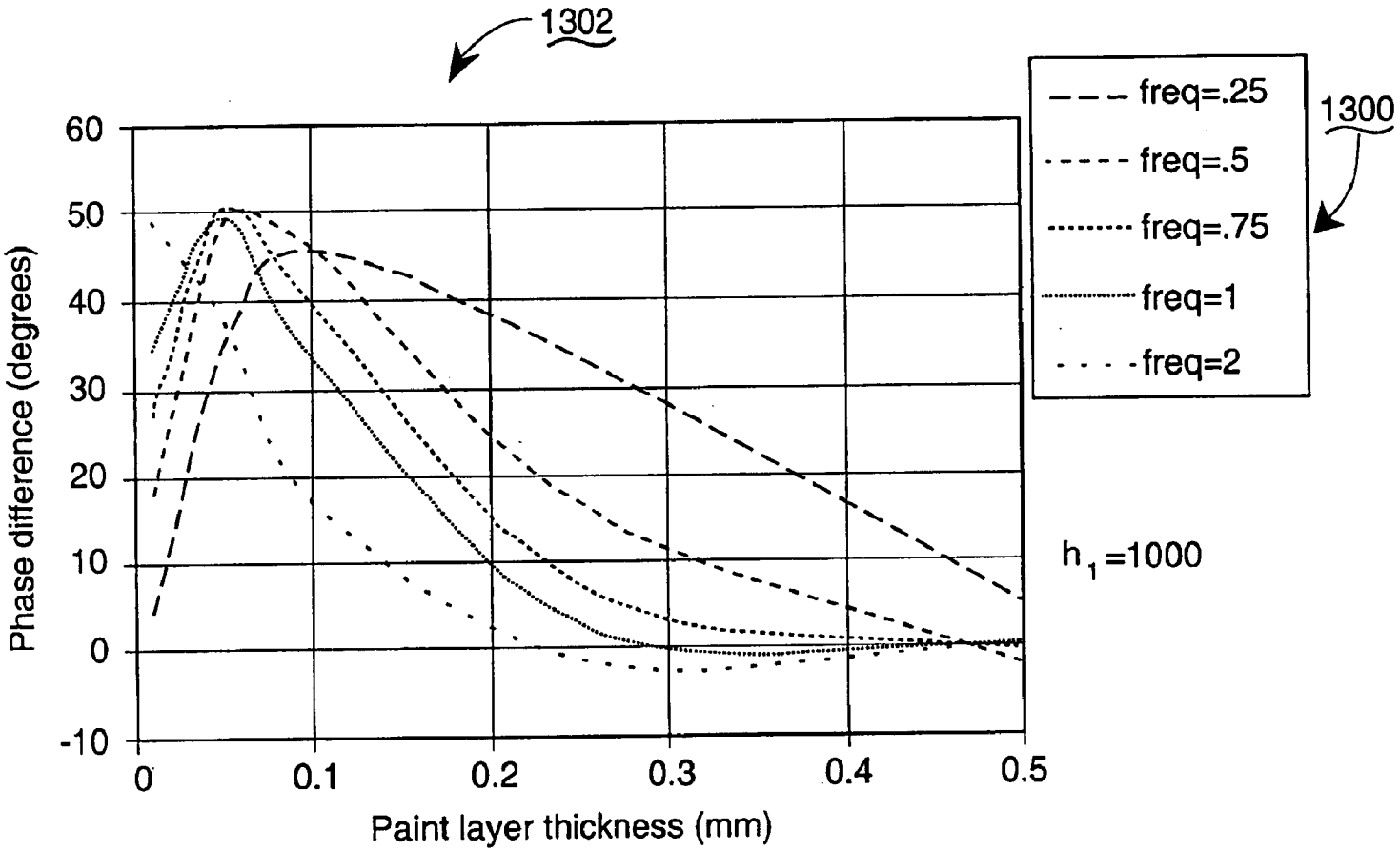
FIG. 13 shows a relationship between phase difference and paint thickness for the present invention.

As can be seen in FIG. 10, the phase difference between surface temperature and thermal energy pulses becomes negligible if the frequency of the sample heating pulses is too high. A significant aspect of the invention is that the heater frequency can be adjusted to give the best resolution of corroded areas, depending on the coating thickness as is shown in FIG. 13 of the drawings herein, where five different lamp pulsation frequencies appear at 1300 and resulting relations between paint layer thickness and phase difference appear in the five curves 1302. In general, thicker coatings require lower frequency heat source operation to enable corrosion detection. By observing the phase lag at different excitation (heater) frequencies, optimum discrimination between signals caused by corrosion and other non-uniformities in the sample system can be obtained.

The optimum operating frequency of the radiant heating system of the present invention, i.e., the heater pulse rate, can be expected to lie between 0.1 and 30 Hz. The methods of controlling the frequency of the incident energy depend on the frequencies needed and range from a simple control of the power to the heater or lamp 202 for low frequency operation to an oscillating reflector(s) 204 for slightly higher frequencies to a shutter system 206 for still higher frequencies. The shutter system 206 may, for example, periodically admit energy from the lamp 202 to the painted surface 310 and obscure the painted surface i.e., capture energy in a heat-sinking element. The switch 318 In the FIG. 3 system may be used to select the appropriate input signal for the differential thermography system according to which of these heat flux modulating arrangements is employed for a particular test.

Figure 9:
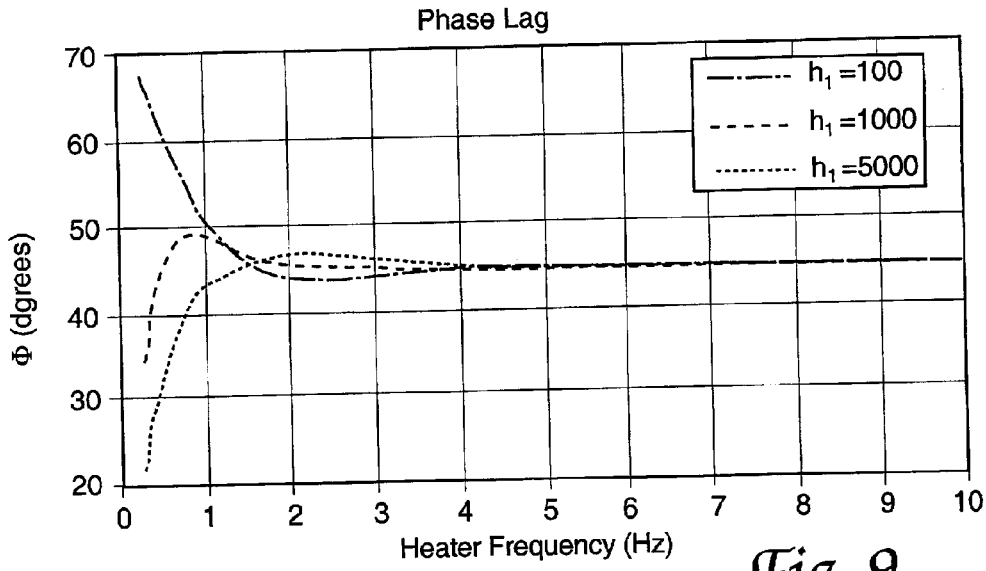
FIG. 9 shows a phase lag relationship between paint surface temperature and heat flux for three different values of thermal conductance in the present invention.

The three curves of FIG. 9 in the drawings show the phase lag between the surface temperature and the Incident heat flux for a paint thickness of 0.254 millimeter and for the three different values of thermal conductance, $h_1$, described above with respect to the FIG. 10 drawing. The FIG. 9 conductance values therefore represent three differing corrosion conditions. The phase lag shown in these plots is dependent on the thermal conductance, $h_1$, and the heater frequency. These curves also illustrate that the heater frequency should be selected to be appropriate for the paint thickness used. If the heater pulse frequency is too high the phase lag is the same regardless of the hi conductance value and the related test is thus not a desirable indicator of corrosion presence.

Figure 11:
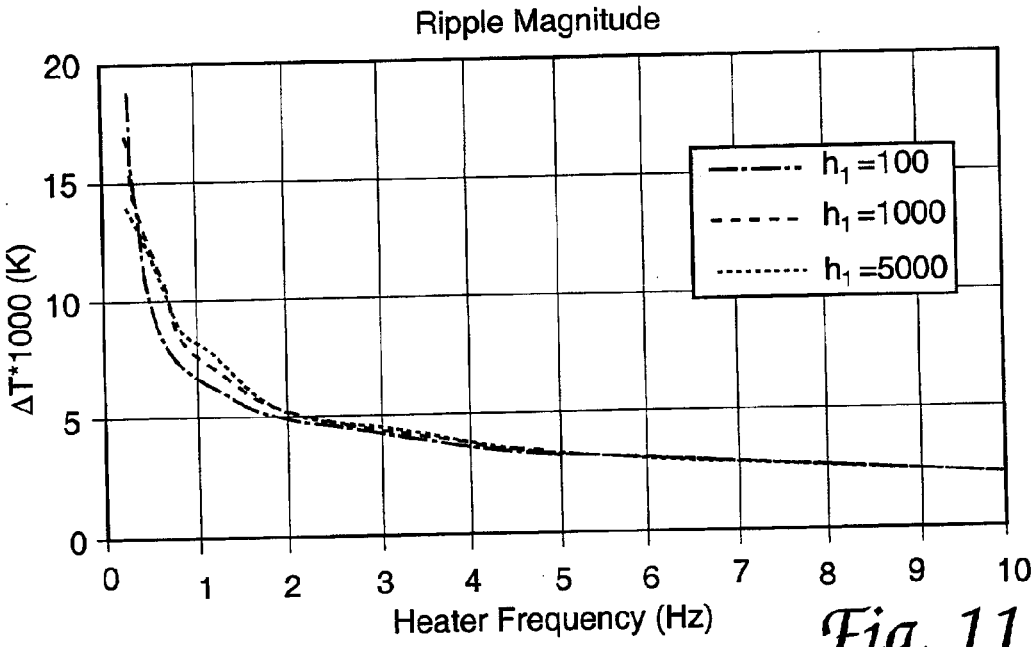
FIG. 11 shows a ripple magnitude relationship for three different values of thermal conductance for the present invention.
Figure 12:
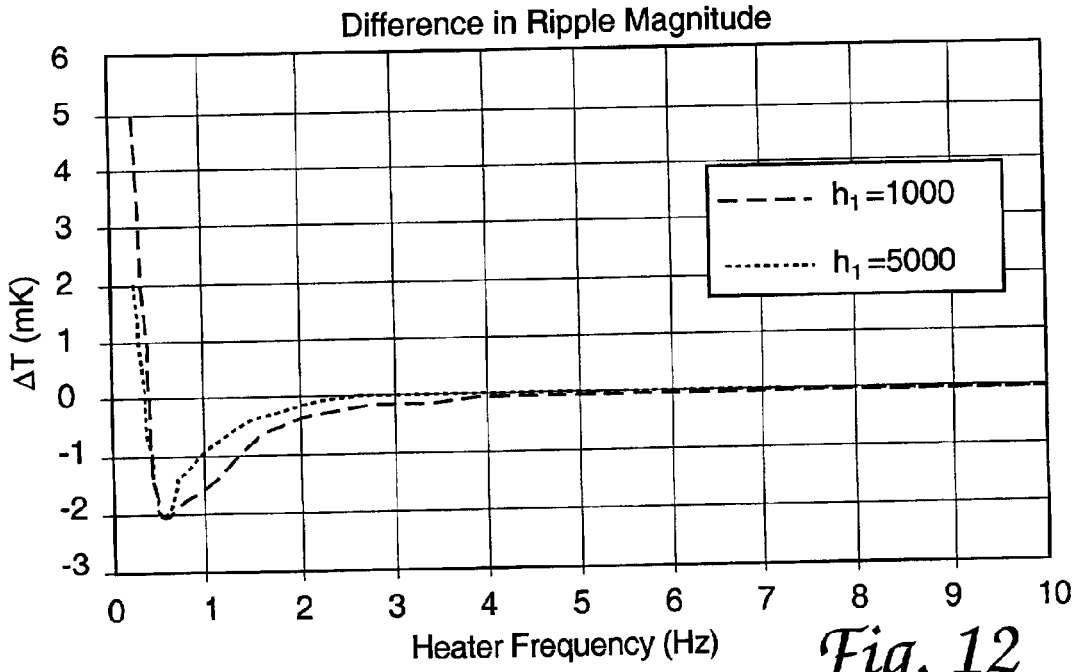
FIG. 12 shows a ripple magnitude difference for two different values of thermal conductance for the present invention.

The three curves of FIG. 11 in the drawings show the magnitude of the sinusoidal ripple superimposed on the average surface temperature of the surface 310 in the FIG. 3 test system. The differential thermography apparatus of the FIG. 3 system filters the total signal obtained from the surface 310 and separates the ripple component of the signal as is described above herein. It may be noted in the FIG. 11 relationships that the ripple magnitude observed is small for the low level incident energy (i.e., $q_o$=10 W/m$^2$) used for the FIG. 11 simulation (the vertical scale in the FIG. 11 drawing represents observed ripple amplitude multiplied by a factor of 1000). Low level incident energy is desirable in-present invention testing because the surface temperature will change by only a few degrees but this condition also makes it harder to detect the ripple magnitude achieved therefore some compromise is appropriate. The relatively small magnitude of the ripple to be observed in the present invention and the importance of radiant flux frequency selection in order to obtain desirable ripple amplitude may also be appreciated from the FIG. 11 relationships. FIG. 12 shows the data from two of the FIG. 11 curves in alternate form and emphasizes the relatively small ripple observations made in connection with the FIG. 11 data.

Figure 6:
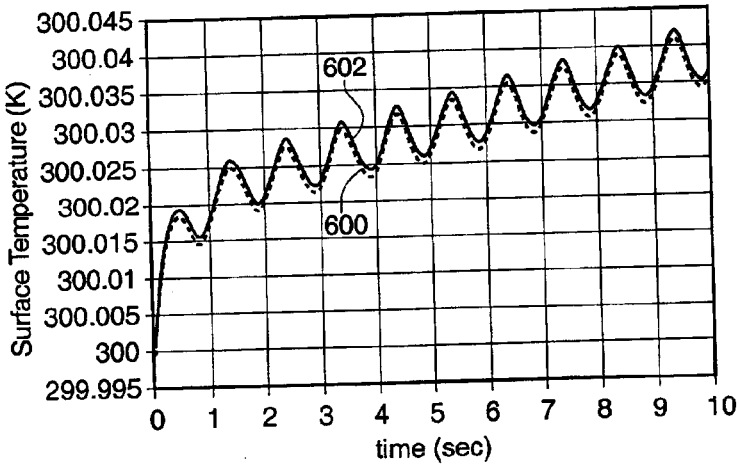
FIG. 6 shows a initial time versus temperature relationship for the present invention.
Figure 7:
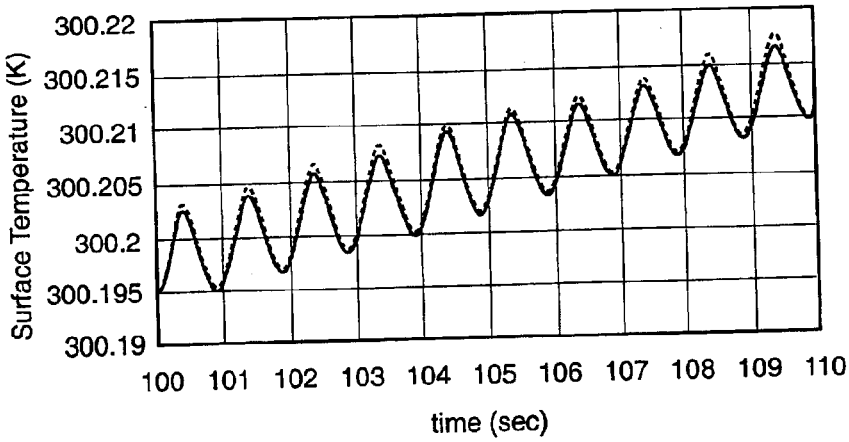
FIG. 7 shows an later time versus temperature relationship for the present invention.

FIG. 6 in the drawings shows the manner in which the surface 301 in FIG. 3 or the surface of the test aircraft 100 in FIG. 1 can be expected to change in response to the pulsations of thermal energy provided in the FIG. 3 system during the first several seconds after energy application. The two different curves in the FIG. 6 data represent two different approaches to simulating the temperature changes occurring during a FIG. 3 test. The data of the solid line curve 600 in FIG. 6 represents a numerical approximation of the relationships defined in an analytical solution for temperature $T_1$ according to equation 1 in the following mathematical discussion of the present invention. The data of the dotted line curve 602 in FIG. 6 represents an analytical solution for temperature $T_2$ in equation 12 in the following mathematical discussion of the present invention.

Figure 8:
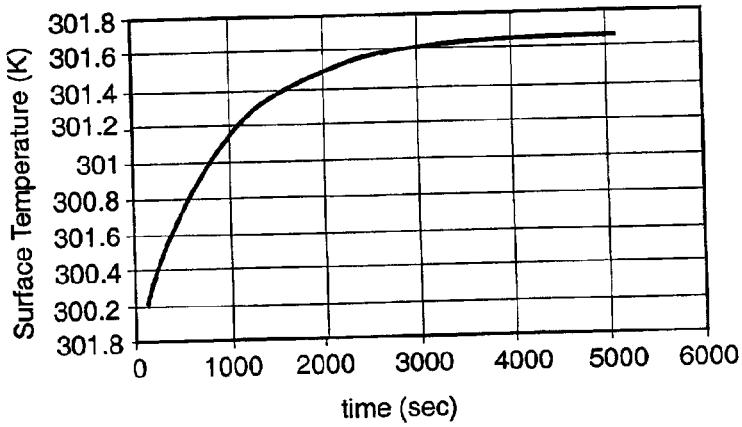
FIG. 8 shows a terminal time versus temperature relationship for the present invention.

A notable aspect of the FIG. 6 data from these two sources lies in the similar results obtained from the two differing temperature prediction approaches. Such similarity enhances confidence with respect to the accuracy of the differential temperature results predicted. The curves in FIG. 7 in the drawings show the FIG. 6 data over a longer period of time. FIG. 8 of the drawings shows a yet longer-term representation of the surface temperatures occurring during a measurement according to the present invention. The FIG. 8 data (which is actually also two curves in closed superposition) may be regarded as the terminal time versus temperature relationship for a test according to the present invention; these curves display the asymptotic nature of the temperature in the right-hand portion of the FIG. 8 curve. The relatively small increments of temperature shown along the vertical axes of the FIG. 6 through FIG. 8 drawings are in keeping with the relatively small thermal flux magnitudes discussion above.

Figure 5:
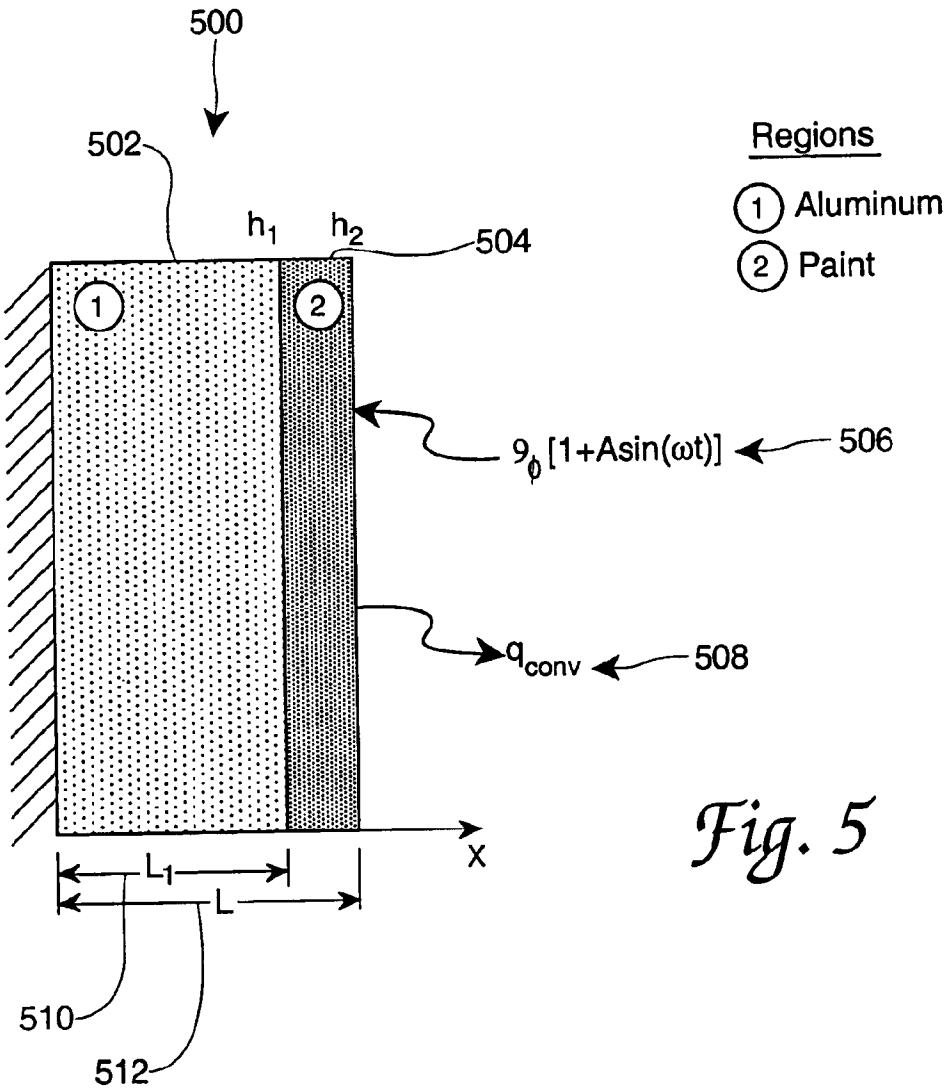
FIG. 5 shows a mathematical analysis diagram for the present invention.

FIG. 5 in the drawings shows a test sample 500 of an aircraft skin surface 502 covered by a layer of paint 504 and undergoing incident radiation infrared heat gain, as is indicated at 506. The FIG. 5 test sample 500 is also experiencing convection heat loss to the ambient as indicated at 508. The skin metal at 502 is also identified as region 1 in the FIG. 5 drawing and is assumed to have the thickness $L_1$ indicated at 510 in the drawing. The overall skin surface 502 in has the thickness L indicated at 512 in FIG. 5. The paint coating 504 on the skin surface metal 502 is also identified as region 2 in the FIG. 5 drawing and has a thickness of $L-L_1$. The FIG. 5 sample 500 may be considered to provide a definitional basis for the following mathematical consideration of the present invention.

For the following mathematical consideration, FIG. 5 may be regarded as showing an aluminum plate with corrosion at the interface between the aluminum and the paint. The effect of the corrosion layer is modeled by a change in the thermal conductance, $h_1$, between the paint and the substrate. If there is no corrosion and the thermal contact is perfect, the conductance $h_1$ is infinite. This corresponds to zero resistance to heat conduction. In real systems the conductance has a large value but is not infinite. As the surface begins to corrode, the thermal conductance decreases and the corrosion layer acts like a thermal insulator. This means less energy will be conducted into the substrate and more will be lost to the environment. It is expected that the change in conductance is similar to that due to surface roughness; a conductance which decreases from 1050 W/m$^2$C to 250 W/m$^2$C for 75S-T6 Aluminum as the roughness increases from 0.254 millimeter to 0.3 millimeter. A mathematical model of the system shown in FIG. 5 solves the heat conduction equation in each layer with additional boundary conditions between layers to account for the thermal conductance at the interface. The heat conduction equation for each region and the associated boundary conditions are given as equations 1.a–d and 2.a–b. Equations 1.b–c, specify that the heat flux is continuous across the interface but the temperature is discontinuous, with the difference being controlled by the value of $h_1$. It is assumed that the system and the surroundings are initially at a uniform temperature $T_o$. At t=0, the painted surface at x=L, is heated by incident radiation such that the absorbed part of the radiant energy is given by q0(1+Asin(ωt)). The back surface at x=0 is considered to be insulated but the results should not be significantly different if heat transfer by convection or radiation is included.

Region 1.

$$\alpha_1 \frac{\partial^2 T_1}{\partial x^2} = \frac{\partial T_1}{\partial t} \quad 0 < x < L_1; \quad t > 0 \tag{1.}$$

$$\frac{\partial T_1}{\partial x} = 0 \quad x = 0; \quad t > 0 \tag{1.a}$$

-continued $$-k_1\frac{\partial T_1}{\partial x}=h_1(T_1-T_2)\quad x=L_1;\quad t>0 \tag{1.b}$$

$$k_1\frac{\partial T_1}{\partial x}=k_2\frac{\partial T_2}{\partial x}\quad x=L_1;\quad t>0 \tag{1.c}$$

$$T=T_o\quad 0<x<L_1;\quad t=0 \tag{1.d}$$

Region 2.

$$\alpha_2\frac{\partial T_2}{\partial x^2}=\frac{\partial T_2}{\partial x}\quad L_1<x<L;\quad t>0 \tag{2.}$$

$$k_2\frac{\partial T_2}{\partial x}+h_2T_2=h_2\underbrace{\left[T_\infty+\frac{q_o(1+A\sin(\omega t))}{h_2T_o}\right]}_{f(t)}\quad x=L;\quad t>0 \tag{2.a}$$

$$T_2=T_o\quad x<L_1<L;\quad t=0 \tag{2.b}$$

This problem can be solved using a Green's function approach for composite media as given by Ozisik.[1] The problem is first transformed using:

$$T_i(x,t)=\theta_i(x,t)+\xi_i(x)f(t) \tag{3}$$

to remove the non-homogeneous boundary condition at x=L which results in a time dependent volumetric heat source term in the heat condition equation. The subscript, i=1,2 refers to the regions 1 and 2. f(t) is defined in eq. (2.a); θ and ν are the solutions to the following auxiliary problems.

Region 1.

$$\alpha_1\frac{\partial^2\theta_1}{\partial x^2}-\xi_1\frac{df(t)}{dt}=\frac{\partial\theta_1}{\partial t}\quad 0<x<L_1;\quad t>0 \tag{4.}$$

$$\frac{\partial\theta_1}{\partial x}=0\quad x=0;\quad t>0 \tag{4.a}$$

$$-k_1\frac{\partial\theta_1}{\partial x}=h_1(\theta_1-\theta_2)\quad x=L_1;\quad t>0 \tag{4.b}$$

$$k_1\frac{\partial\theta_1}{\partial x}=k_2\frac{\partial\theta_2}{\partial x}\quad x=L_1;\quad t>0 \tag{4.c}$$

$$\theta_1(0)=T_o-f(0)\quad 0<x<L_1;\quad t=0 \tag{4.d}$$

Region 2.

$$\alpha_2\frac{\partial\theta_2}{\partial x^2}-\xi_2\frac{df(t)}{dt}=\frac{\partial\theta_2}{\partial x}\quad L_1<x<L;\quad t>0 \tag{5.}$$

$$k_2\frac{\partial\theta_2}{\partial x}+h_2\theta_2=0\quad x=L;\quad t>0 \tag{5.a}$$

$$\theta_2(0)=T_o-f(0)\quad L_1<x<L\quad t=0 \tag{5.b}$$

Region 1.

$$\frac{\partial^2\xi_1}{\partial x^2}=0\quad 0<x<L_1 \tag{6}$$

$$\frac{\partial\xi_1}{\partial x}=0\quad x=0 \tag{6.a}$$

$$-k_1\frac{\partial\xi_1}{\partial x}=h_1(\xi_1-\xi_2)\quad x=L_1 \tag{6.b}$$

$$k_1\frac{\partial\xi_1}{\partial x}=k_2\frac{\partial\xi_2}{\partial x}\quad x=L_1 \tag{6.c}$$

Region 2.

$$\frac{\partial^2\xi_2}{\partial x^2}=0\quad L_1<x<L \tag{7}$$

$$k_2\frac{\partial\xi_2}{\partial x}+h_2\xi_2=h_2\quad x=L_1 \tag{7.a}$$

For this problem, $\xi_1=\xi_2$ and reduce to 1.

The solution for $\theta_i(x,t)$ can be written in terms of Green's function as:

$$\theta_i(x,t)=\sum_{j=1}^{2}\left\{\int_{x_j}^{x_{j+1}}G_{ij}(x,t\,|\,x',\tau)|_{\tau=0}F_j(x')dx'+\int_{\tau=0}^{t}\int_{x_j}^{x_{j+1}}G_{ij}(x,t\,|\,x',\tau)\left[\frac{\alpha_j}{k_j}g_j(x',\tau)\right]dx'd\tau\right\} \tag{8}$$

Where the Green's function is defined as:

$$G_{ij}(x,t\,|\,x',\tau)=\sum_{n=1}^{\infty}\frac{e^{-\beta_n^2(t-\tau)\left(\frac{k_j}{\alpha_j}\right)}\Psi_{in}(x)\Psi_{jn}(x')}{N_n} \tag{9}$$

The normalization integral is:

$$N_n=\sum_{j=1}^{2}\left(\frac{k_j}{\alpha_j}\right)\int_{x_j}^{x_{j+1}}\Psi_{jn}^2(x)dx \tag{10}$$

The eigenfunctions are:

$$\Psi_{in}(x^*)=A_{in}\sin\left(\frac{\beta_nLx^*}{\sqrt{\alpha_i}}\right)+B_{in}\cos\left(\frac{\beta_nLx^*}{\sqrt{\alpha_i}}\right) \tag{11}$$

The eigenvalues $\beta_n$ and constants $A_{in}$ and $B_{in}$ are determined from the boundary conditions to arrive at a solution for $\theta_i(x,t)$ which is then substituted into equation 3 for $T_i(x,t)$. For this problem, only the surface temperature is desired. This can be written as:

$$T_2(L,t)=T_\infty+\frac{q_o}{h_2}\left\{1+A\sin(\omega t)-\sum_{n=1}^{\infty}\left[C_{in}e^{-\beta_n^2t}+A\omega C_n\sin(\omega t+\phi_n)\right]\right\} \tag{12}$$

where $$\phi_n=\frac{\beta^2n}{\omega}$$

$$C_{in}=\frac{\Psi_{2n}(L)}{N_n}\left[1-\frac{A\omega\beta_n^2}{\beta_n^4+\omega^2}\right]\left\{\frac{k_1}{\alpha_1}\int_0^{L_1}\Psi_{1n}(x)dx+\frac{k_2}{\alpha_2}\int_{L_1}^{L}\Psi_{2n}(x)dx\right\} \tag{13}$$

$$C_n=\frac{\Psi_{2n}(L)}{N_n\sqrt{\beta_n^2+\omega^2}}\left\{\frac{k_1}{\alpha_1}\int_0^{L_1}\Psi_{1n}(x)dx+\frac{k_2}{\alpha_2}\int_{L_1}^{L}\Psi_{2n}(x)dx\right\} \tag{14}$$

The eigenvalues are found by setting the determinent given in equation 15 equal to zero.

$$\begin{vmatrix} \frac{\gamma_1}{H_1}\sin(\gamma_1 L_1) - \cos(\gamma_1 L_1) & \sin(\gamma_2 L_1) & \cos(\gamma_2 L_1) \\ \frac{k_1}{k_2}\sqrt{\frac{\alpha_2}{\alpha_1}}\sin(\gamma_1 L_1) & \cos(\gamma_2 L_1) & -\sin(\gamma_2 L_1) \\ 0 & \gamma_2\cos(\gamma_2 L) + H_2\sin(\gamma_2 L) & -\gamma_2\sin(\gamma_2 L) + H_2\cos(\gamma_2 L) \end{vmatrix} \quad (15)$$

where $$H_i = h_i / k_i;\ \gamma_i = \frac{\beta_n}{\sqrt{\alpha_i}}$$

The exponential term in equation (12) can be filtered out and the other terms combined to give:

$$T_f(L,t)=(\omega t+\phi) \quad (16)$$

where $$C = \sqrt{\left[\sum_{n=0}^{\infty} C_n\cos(\phi_n)\right]^2 + \left[\sum_{n=0}^{\infty} C_n\sin(\phi_n)\right]^2} \quad (17)$$

$$\phi = \tan^{-1}\left(\frac{\sum_{n=0}^{\infty} C_n\sin(\phi_n)}{\sum_{n=0}^{\infty} C_n\cos(\phi_n)}\right) - \pi \quad (18)$$

The phase angle $\phi$ is seen to be a function of the parameters, $L_1$, L, $k_1$, $k_2$, $\alpha_1$, $\alpha_2$, $h_1$, $h_2$, qo and $\omega$. The dependence on $h_1$ makes $\phi$ useful for corrosion detection because the thermal conductance changes when corrosion is present.

Reflected energy from the lamp to the detector will be at the load frequency but with a negligible phase lag.

If the coating is radiatively gray:

$$q''_r=(1-\epsilon)F_{16\text{-}24000}(\lambda T)F_{s\text{-}d}q_o(1+A\sin(\omega t))$$

This can be subtracted from the detector signal. For a 2000° K. source $F_{16\text{-}24000}(\lambda T)\approx 0.0171$, i.e., 98% of the radiation is outside a detector range of 8–12$\mu$m.

The view factor will cause a change in magnitude of detected temperature signal but should not affect the phase lag.

The sensitivity of $\phi$ to the different parameters may be examined, i.e., $$S_i = \frac{\partial\phi}{\partial z_i} \quad (19)$$

This relationship may be used to seek a method of data analysis that is Insensitive to paint thickness. reflectance, and view factor but is sensitive to conductance between paint and aluminum.

The present invention therefore appears to offer several advantages with respect to other arrangements for inspecting aircraft and other structures for the presence of hidden corrosion. Among these advantages are the characteristics of the disclosed system being:

Non-contacting

Sensitive to the corrosion layer

Insensitive to coating thickness, emissivity

Insensitive to substrate dimensions

Insensitive to sensor view factor (i.e., perpendicularity of the camera with respect to the aircraft surface)

Quick

Inexpensive

Able to be used to detect patches of corrosion or existence of corrosion if It is located over the entire region of interest The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular scope of the invention as determined by the appended claims when interpreted in accordance with the breadth to which they are fairly, legally and equitably entitled.

I claim:

1. A method of detecting corrosion presence intermediate an aircraft workpiece metal substrate and an overlying layer of organic material, said method comprising the steps of:

applying a continuing periodic sequence of radiant thermal energy pulses of repetition frequency below ten Hertz to said aircraft workpiece metal substrate and overlying layer of organic material;

said radiant thermal energy pulses communicating from an external surface portion of said layer of organic material through said layer of organic material to said aircraft workpiece metal substrate;

sensing instantaneous temperature response undulations of said surface portion of said aircraft workpiece overlying layer of organic material in response to said continuing periodic sequence of radiant thermal energy pulses;

determining a phase angle of lag between said applied continuing periodic sequence of radiant thermal energy pulses and said instantaneous temperature response undulations of said surface portion of said workpiece overlying layer of organic material; and examining a workpiece map of said determined phase angles of lag for a corrosion presence-related pattern of instantaneous temperature response undulation phase angle variations.

2. The method of detecting corrosion presence intermediate an aircraft workpiece metal substrate and an overlying layer of organic material of claim 1 further including the step of optimizing said instantaneous temperature response undulations of said surface portion of said workpiece overlying layer of organic material by altering at least one of a pulse duration characteristic and a pulse frequency characteristic of said continuing periodic sequence of radiant thermal energy pulses.

3. The method of detecting corrosion presence intermediate an aircraft workpiece metal substrate and an overlying layer of organic material of claim 1 wherein said step of sensing instantaneous temperature response undulations of said surface portion of said aircraft workpiece overlying layer of organic material includes the step of enhancing a relative amplitude of a signal relating to said instantaneous temperature response undulations of said surface portion of said workpiece-overlying layer of organic material with respect to: extraneous noise signals components by filtering said signal relating to said instantaneous; temperature response undulations of said surface portion of said workpiece.

4. The method of detecting corrosion presence intermediate an aircraft workpiece metal substrate and an overlying layer of organic material of claim 1 wherein said aircraft workpiece metal substrate comprises a metal skin portion of said aircraft and said overlying layer of organic material comprises an organic material coating on said aircraft metal skin portion.

5. The method of detecting corrosion presence intermediate an aircraft workpiece metal substrate and an overlying layer of organic material of claim 4 wherein said aircraft workpiece metal substrate comprises an aluminum inclusive metal skin portion of an aircraft.

6. The method of detecting corrosion presence intermediate an aircraft workpiece metal substrate and an overlying layer of organic material of claim 4 wherein said step of applying a continuing periodic sequence of radiant thermal energy pulses of frequency below ten Hertz to said aircraft workpiece metal substrate and overlying layer of organic material includes a step of generating said continuing periodic sequence of radiant thermal energy pulses through one of:

modulating electrical current flowing to an electrical energy to thermal energy transducer element generating said radiant thermal energy to generate said pulses of radiant thermal energy, shutter modulating an optical output of an electrical energy to thermal energy transducer element generating said radiant thermal energy to generate said pulses of radiant thermal energy, and altering a mechanical position of an optical reflector element associated with an electrical energy to thermal energy transducer element generating said radiant thermal energy to generate said pulses of radiant thermal energy.

7. The method of detecting corrosion presence intermediate an aircraft workpiece metal substrate and an overlying layer of organic material of claim 1 further including the step of controlling said step of applying a continuing periodic sequence of radiant thermal energy pulses of frequency below ten Hertz to said aircraft workpiece metal substrate and overlying layer of organic material in order to optimize a relationship between aircraft workpiece temperature rise and amplitude of said instantaneous temperature response undulations.

8. An apparatus responsive to corrosion presence intermediate an aircraft component workpiece metal substrate and an overlying layer of organic material, said apparatus comprising the combination of:

means for applying a continuing periodic sequence of radiant thermal energy pulses of frequency below ten Hertz to said workpiece metal substrate and said overlying layer of organic material;

said radiant thermal energy pulses communicating from an external surface portion of said layer of organic material through said layer of organic material to said aircraft component workpiece metal substrate;

means for sensing instantaneous temperature response undulations of said surface portion of said aircraft component workpiece overlying layer of organic material in response to said continuing periodic sequence of radiant thermal energy pulses;

means for determining a phase angle of lag between said applied continuing periodic sequence of radiant thermal energy pulses and said instantaneous temperature response undulations of said surface portion of said aircraft component workpiece overlying layer of organic material; and means for generating an aircraft component workpiece map of said determined phase angles of lag, said map including a corrosion presence-related pattern of instantaneous temperature response undulation phase angle variations.

9. The apparatus responsive to corrosion presence intermediate a an aircraft workpiece metal substrate and an overlying layer of organic material of claim 8 wherein said means for applying a continuing periodic sequence of radiant thermal energy pulses to said aircraft workpiece includes one of a controllable lamp current modulator apparatus, a movable lamp reflector and an optical energy modulator apparatus.

10. The apparatus responsive to corrosion presence intermediate an aircraft workpiece metal substrate and an overlying layer of organic material of claim 8 wherein said means for applying a continuing periodic sequence of radiant thermal energy pulses to said workpiece metal substrate and said overlying layer of organic material further includes control means for modifying a time characteristic of said continuing periodic sequence of radiant thermal energy pulses and increasing said sensed instantaneous temperature response undulations of said surface portion of said workpiece overlying layer of organic material.

11. A contact free method of detecting corrosion presence intermediate a covered metal skin portion of an aircraft and an overlying paint coating layer, said method comprising the steps of:

applying a continuing periodic sequence of infrared radiant thermal energy pulses of selected pulse frequency below ten Hertz to an external surface region of said overlying paint coating layer of said aircraft;

said radiant thermal energy pulses communicating thermal energy from said external surface region of said overlying paint coating layer through said paint coating layer and into said covered metal skin portion of said aircraft at a first rate in aircraft metal skin regions free of corrosion presence and at a lesser second rate in aircraft metal skin regions having corrosion presence intermediate said overlying paint coating layer and said metal skin portion;

optically sensing overlying paint coating layer external surface region instantaneous temperature response undulations responding to said continuing periodic sequence of radiant thermal energy pulses;

determining a phase angle of lag between said applied continuing periodic sequence of radiant thermal energy pulses and said overlying paint coating layer external surface region instantaneous temperature response undulations;

examining an aircraft metal skin portion surface mapping of said determined phase angles of lag for a corrosion presence-related disturbed pattern of instantaneous temperature response undulation phase angles; and selecting time and frequency characteristics of said continuing periodic sequence of infrared radiant thermal energy pulses in response to achieving one of an increased amplitude of said optically sensed overlying paint coating layer external surface region instantaneous temperature response undulations and an increased phase angle of lag between said applied continuing periodic sequence of radiant thermal energy pulses and said overlying paint coating layer external surface region instantaneous temperature response undulations.

* * * * *